United States Patent
Yokota

[11] Patent Number: 5,363,242
[45] Date of Patent: Nov. 8, 1994

[54] ZOOM LENS OF REAR FOCUS TYPE

[75] Inventor: Hideo Yokota, Kanagawa, Japan

[73] Assignee: Canon Kabushiki Kaisha, Tokyo, Japan

[21] Appl. No.: 62,220

[22] Filed: May 18, 1993

[30] Foreign Application Priority Data

May 22, 1992 [JP] Japan .................. 4-155745

[51] Int. Cl.$^5$ ............... G02B 15/14; G02B 13/18
[52] U.S. Cl. .................. 359/684; 359/686; 359/687; 359/715
[58] Field of Search .......... 359/684, 687, 686, 715, 359/774, 225

[56] References Cited

U.S. PATENT DOCUMENTS

| | | | |
|---|---|---|---|
| 4,836,663 | 6/1989 | Hirakawa | 359/687 |
| 5,009,492 | 4/1991 | Hamano | 359/684 |
| 5,221,994 | 6/1993 | Nishio | 359/687 |
| 5,235,466 | 8/1993 | Ono et al. | 359/715 |

FOREIGN PATENT DOCUMENTS

| | | |
|---|---|---|
| 58-136012 | 8/1983 | Japan . |
| 58-160913 | 9/1983 | Japan . |
| 62-247316 | 10/1987 | Japan . |
| 63-44614 | 2/1988 | Japan . |
| 1-24213 | 1/1989 | Japan . |

*Primary Examiner*—Eugene R. LaRoche
*Assistant Examiner*—Son Dinh

*Attorney, Agent, or Firm*—Fitzpatrick, Cella, Harper & Scinto

[57] ABSTRACT

A zoom lens of the rear focus type is disclosed, including, from front to rear, a first lens unit of positive refractive power, a second lens unit of negative refractive power, a third lens unit of positive refractive power and a fourth lens unit of positive refractive power, the second lens unit being moved toward the image side when zooming from the wide-angle end to the telephoto end, while moving the fourth lens unit to compensate for the image shift with zooming, and focusing being performed by moving the fourth lens unit. The third lens unit consists of a positive single lens having an aspheric surface. The fourth lens unit includes a negative first lens and a positive second lens, and at least one of lens surfaces of the the first and second lenses is aspherical. Letting the overall focal length of the third and fourth lens units in the wide-angle end be denoted by f3,4, the focal length of the entire lens system in the wide-angle end is denoted by Fw, the distance from the last lens surface to an image plane which is shortest in an entire zooming range when focusing on an infinitely distant object is denoted by Fb, and the zoom ratio denoted by Z, the following conditions are satisfied:

$$2.2 < |Fb/Fw|$$

$$2.9 < \sqrt{Z} \cdot Fb/f3,4 < 3.5$$

4 Claims, 11 Drawing Sheets

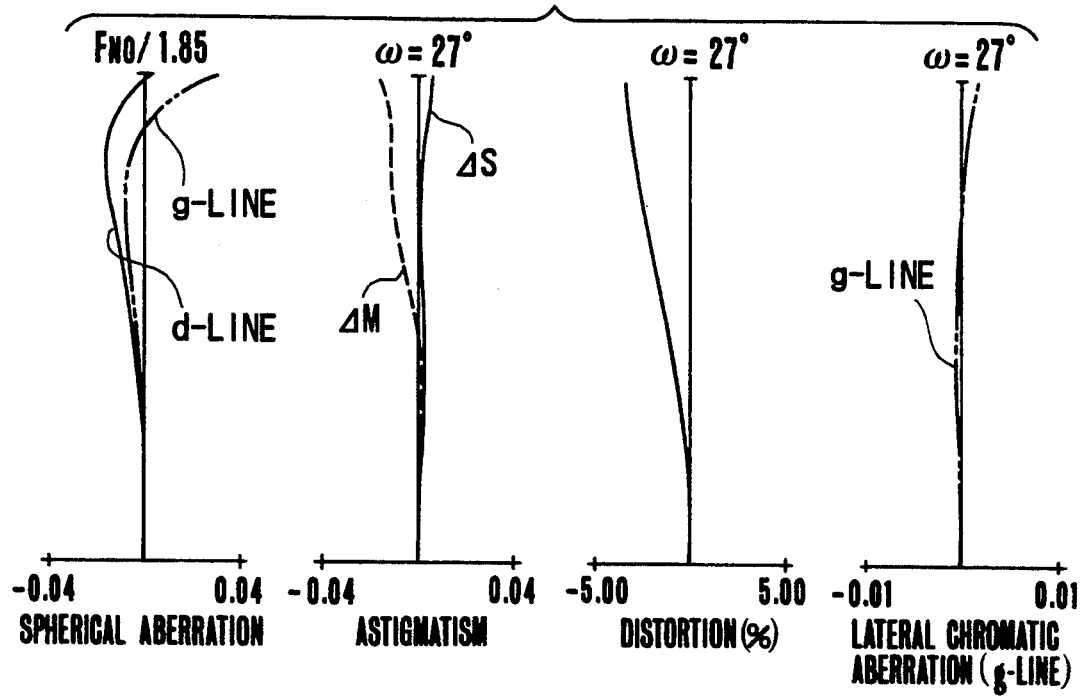
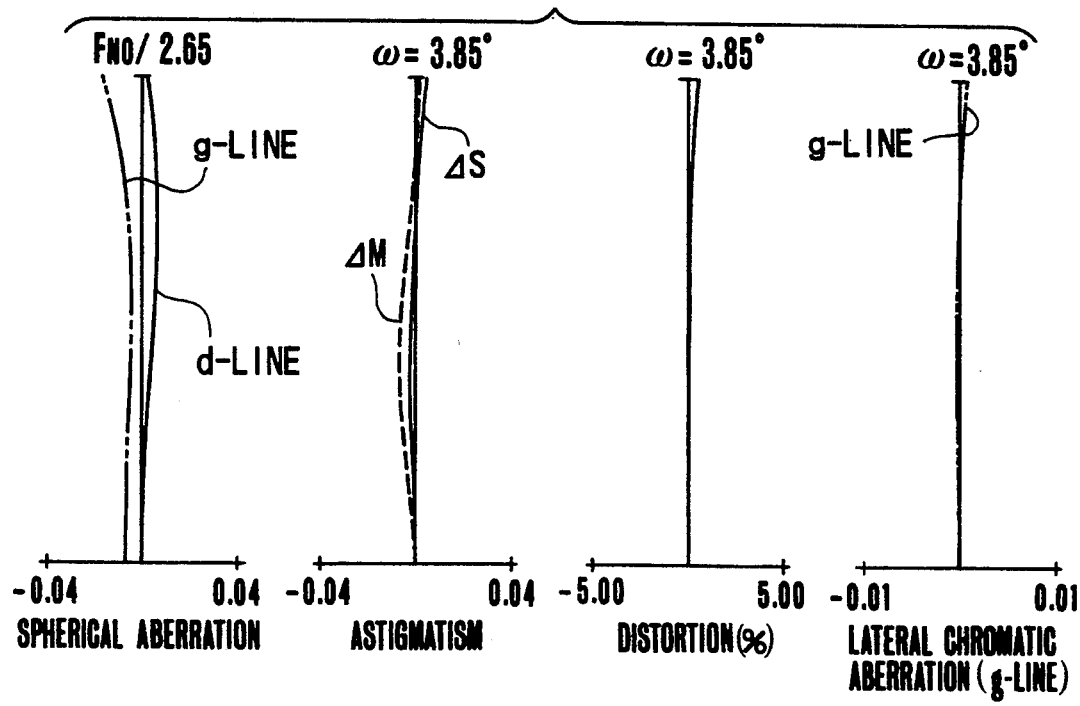

ZOOM LENS OF REAR FOCUS TYPE

BACKGROUND OF THE INVENTION

1. Field of the Invention

This invention relates to zoom lenses of the rear focus type and, more particularly, to high range, large relative aperture zoom lenses of the rear focus type having a range of 8 to 10 and F-number of about 1.8 and having a short total length, to be used in photographic cameras, video cameras, or broadcast cameras.

2. Description of the Related Art

It has been known to make the focusing provision in a lens unit other than the front or first lens unit of a zoom lens for a photographic camera or video camera. The so-called rear focus type, among others, has found its use in an increasing number of zoom lenses.

The advantages that the zoom lenses of the rear focus type of zoom lens, generally have as compared with an ordinary type which, when focusing, moves the first lens unit, are that the effective diameter of the first lens unit gets small, making it easier to minimize the bulk and size of the entire lens system, and that close-up photography, particularly macrophotography, becomes easy to perform, and further that, since the focusing lens unit is of relatively small size and light weight, a weaker driving power for that lens unit is sufficient, thereby allowing focusing to be performed quickly and easily.

As examples of such a rear focus type zoom lens, mention may be made of Japanese Laid-Open Patent Application No. Sho 63-44614, in which, where, as counted from the object side, a first lens unit of positive refractive power, a second lens unit of negative refractive power for varying the focal length, a third lens unit of negative refractive power for compensating for the image shift with zooming and a fourth lens unit of positive refractive power, totaling four lens units, constitute a so-called 4-unit zoom lens wherein the third lens unit is moved to effect focusing. This feature has to secure a space for movement of the third lens unit. Accordingly, the physical length tends to increase.

In Japanese Laid-Open Patent Application No. Sho 58-136012, the zooming section is constructed with three or more lens units, one of which is made movable for focusing.

Japanese Laid-Open Patent Applications Nos. Sho 62-24213 and Sho 63-247316 disclose a zoom lens having four lens units of which the first, when counted from the object side, is of positive refractive power, the second is of negative refractive power, the third is of positive refractive power and the fourth is of positive refractive power, wherein the second lens unit is moved to vary the focal length and the fourth lens unit is moved to compensate for the image shift with zooming and is given the focusing function.

In Japanese Laid-Open Patent Application No. Sho 58-160913, a first lens unit of positive power, a second lens unit of negative refractive power, a third lens unit of positive refractive power and a fourth lens unit of positive refractive power are arranged in this order from the object side, wherein the first and second lens units are moved to vary the focal length, while the fourth lens unit is moved to compensate for the image shift with zooming, whereby one or two or more of these lens units are moved to effect focusing.

Recently, in the field of art of video cameras, an image sensing means in the form of a solid-state image sensor (CCD) has been reduced in size. In more detail, a solid-state image sensor of as small a size as $\frac{1}{3}$ or $\frac{1}{4}$ in. is used in place of one of conventional size, or $\frac{2}{3}$ or $\frac{1}{2}$ in. With the reduction in size of the solid-state image sensor, there is a demand for even more of a reduction in the size of the zoom lens which is to be used therewith.

With respect to the photographic lens for use in the video camera, the distance from the last lens surface to the image sensing plane, i.e., the back focal distance, is relatively long so that the dust or foreign particles on the last lens surface do not have a bad influence on the image projected on the image sensing plane.

If, as the design of the zoom lens adapted to, for example, the $\frac{1}{2}$ in. image sensor is used in making up a zoom lens for the $\frac{1}{4}$ in. image sensor, the dimensions of the zoom lens are reduced merely in proportion, however, the back focal distance, too, gets proportionally ($\frac{1}{2}$ times) shorter. Then, the foreign particles on the last lens surface cast their appreciable shadow on the image sensing plane of the image sensor, giving rise to a problem that the image quality is lowered. For this reason, the zoom lens for a video camera has, despite the reduction of the size of the image sensor, to have its back focal distance kept longer than a predetermined value.

In general, the use of the rear focus type in the zoom lenses leads to possibilities of minimizing the bulk and size of the entire lens system and also of speeding up the focusing process.

In turn, however, the variation of aberrations with focusing is caused to increase, giving rise to a problem in that the optical performance is very difficult to keep high throughout the entire range of object distances while still permitting minimization of the size of the entire lens system to be achieved. Particularly, for a large relative aperture and high range zoom lens, another problem arises in that good stability of optical performance is very difficult to obtain throughout the entire zooming range as well as the entire focusing range.

SUMMARY OF THE INVENTION

The present invention employs the rear focus type in achieving a minimization of the size of the entire lens system at an increased relative aperture and an extended zooming range, while still maintaining good stability of optical performance from the wide-angle end to the telephoto end, i.e., throughout the entire zooming range, and from an infinitely distant object to an object at the minimum distance, i.e., throughout the entire focusing range. It is, therefore, an object of the invention to provide a zoom lens of the rear focus type which, despite having such features, gets a certain desired back focal distance.

A zoom lens of the rear focus type according to the invention comprises, from front to rear, a first lens unit of positive refractive power, a second lens unit of negative refractive power, a third lens unit of positive refractive power and a fourth lens unit of positive refractive power, zooming from the wide-angle end to the telephoto end being performed by moving the second lens unit toward the image side while moving the fourth lens unit to compensate for the image shift with zooming, and focusing being performed by moving the fourth lens unit, wherein the third lens unit consists of a positive single lens having an aspheric surface, the fourth lens unit includes a negative first lens and a positive second lens, and at least one of lens surfaces of the first and second lenses is aspherical, whereby letting the overall focal length of the third and fourth lens units in the wide-angle end be denoted by f3,4, the focal length of the entire lens system in the wide-angle end by Fw, the distance from the last lens surface to an image plane which is shortest in an entire zooming range when focusing on an infinitely distant object, i.e., the back focal distance, by Fb, and the zoom ratio by Z, the following conditions are satisfied:

$$2.2 < |Fb/Fw| \tag{1}$$

$$2.9 < \sqrt{Z} \cdot Fb/f3,4 < 3.5 \tag{2}$$

BRIEF DESCRIPTION OF THE DRAWINGS

FIG. 9 shows graphic representations of the various aberrations of the numerical example 1 of the invention in the wide-angle end.

FIG. 10 shows graphic representations of the various aberrations of the numerical example 1 of the invention in the telephoto end.

DETAILED DESCRIPTION OF THE PREFERRED EMBODIMENTS

Figure 1:
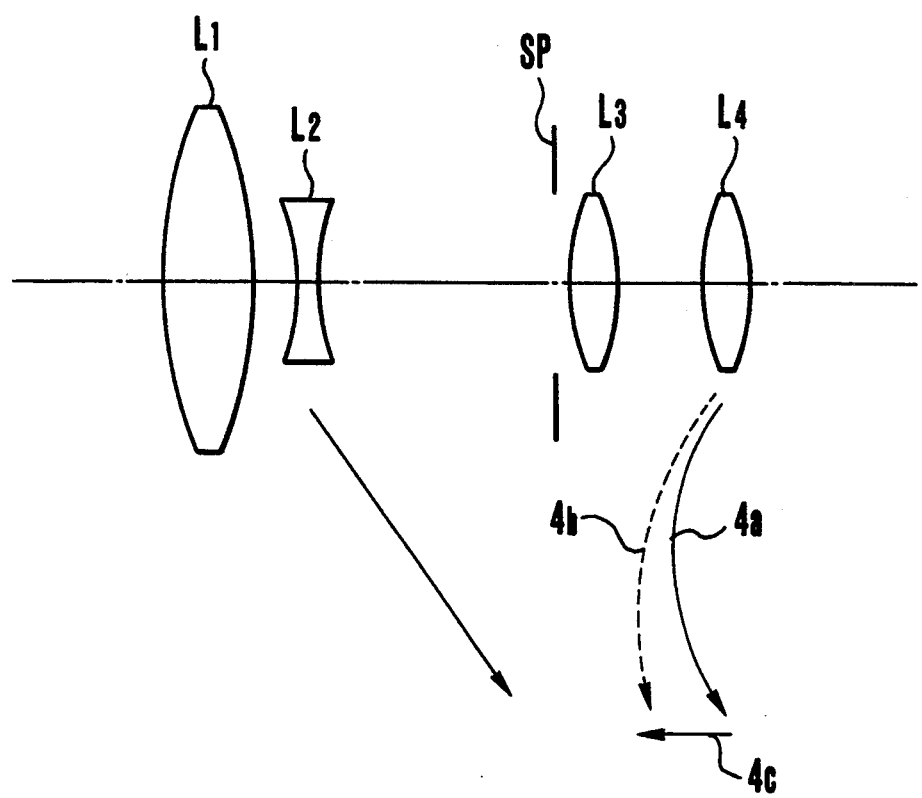
FIG. 1 is a diagram used to explain the paraxial refractive power arrangement of the invention.
Figure 2:
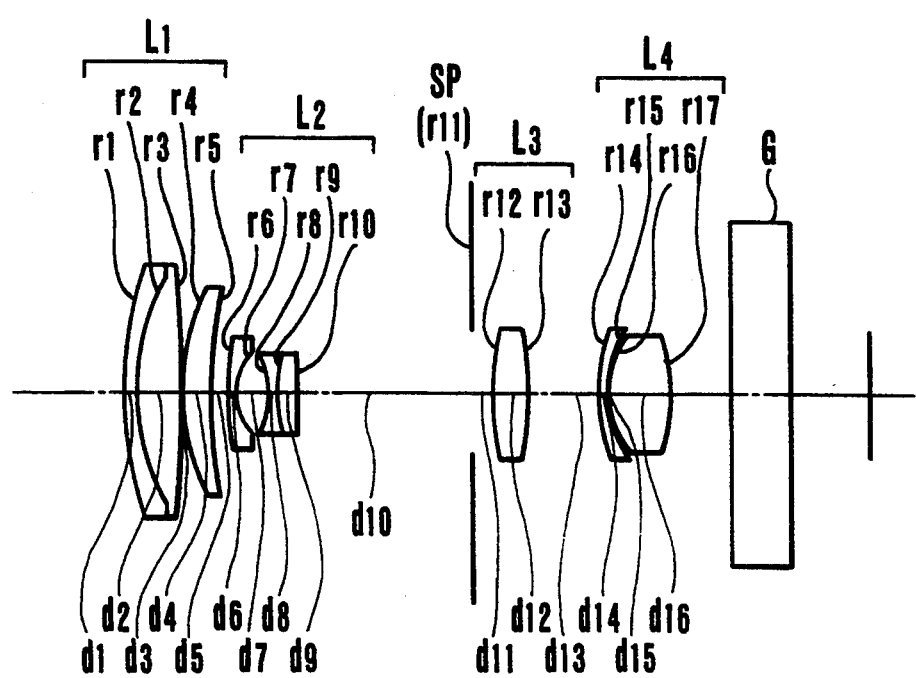
FIG. 2 is a longitudinal section view of a numerical example 1 of a zoom lens of the invention.
Figure 3:
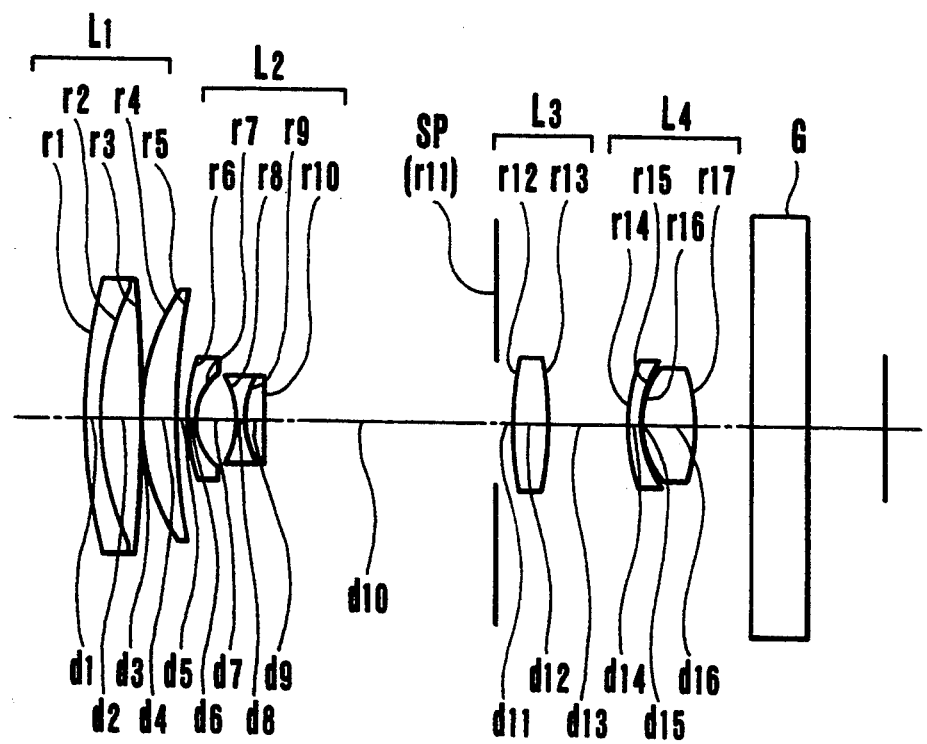
FIG. 3 is a longitudinal section view of a numerical example 2 of a zoom lens of the invention.
Figure 4:
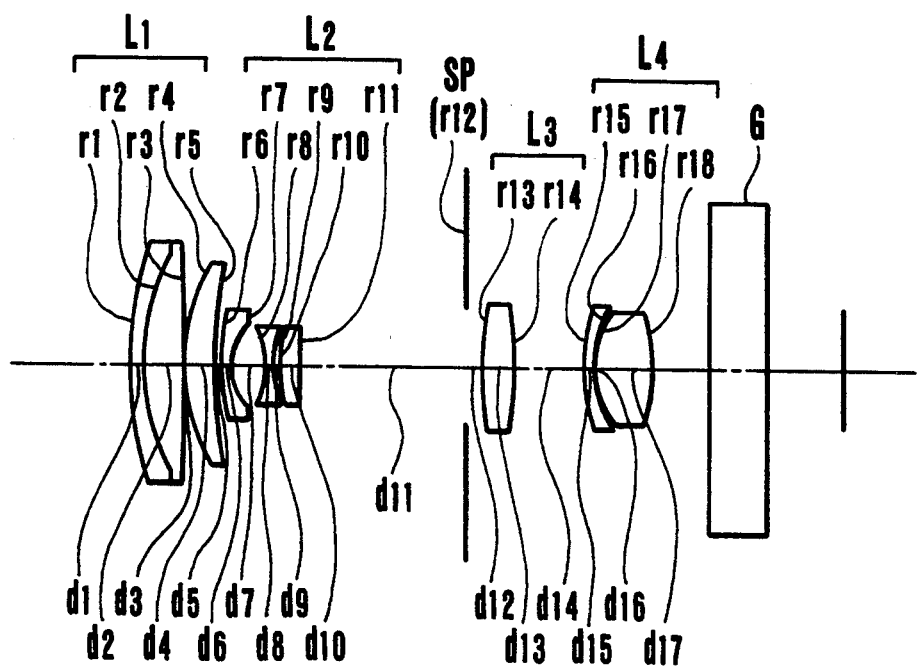
FIG. 4 is a longitudinal section view of a numerical example 3 of a zoom lens of the invention.
Figure 5:
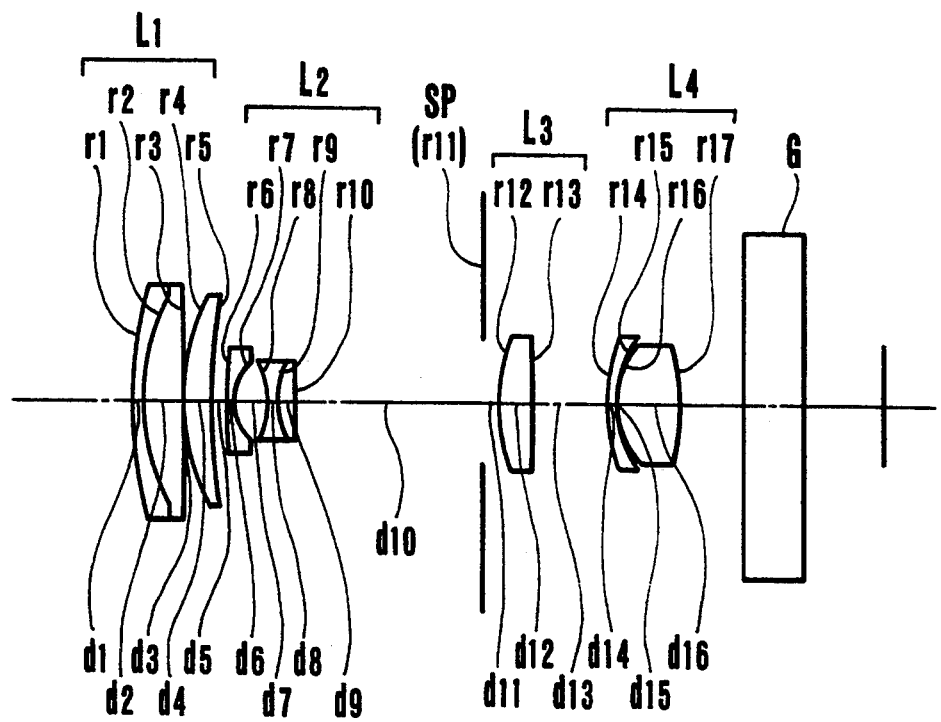
FIG. 5 is a longitudinal section view of a numerical example 4 of a zoom lens of the invention.
Figure 6:
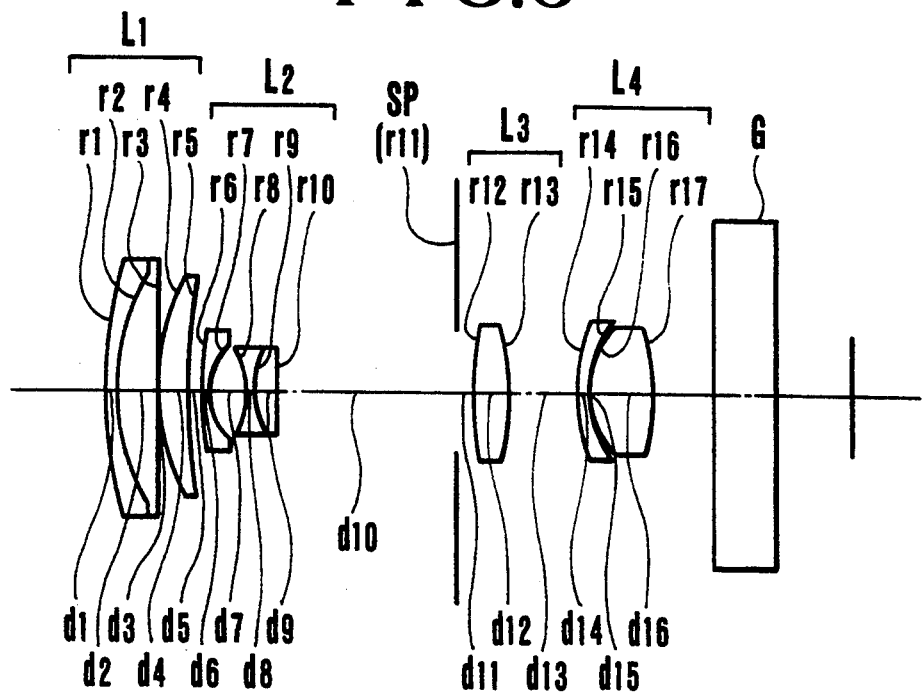
FIG. 6 is a longitudinal section view of a numerical example 5 of a zoom lens of the invention.
Figure 7:
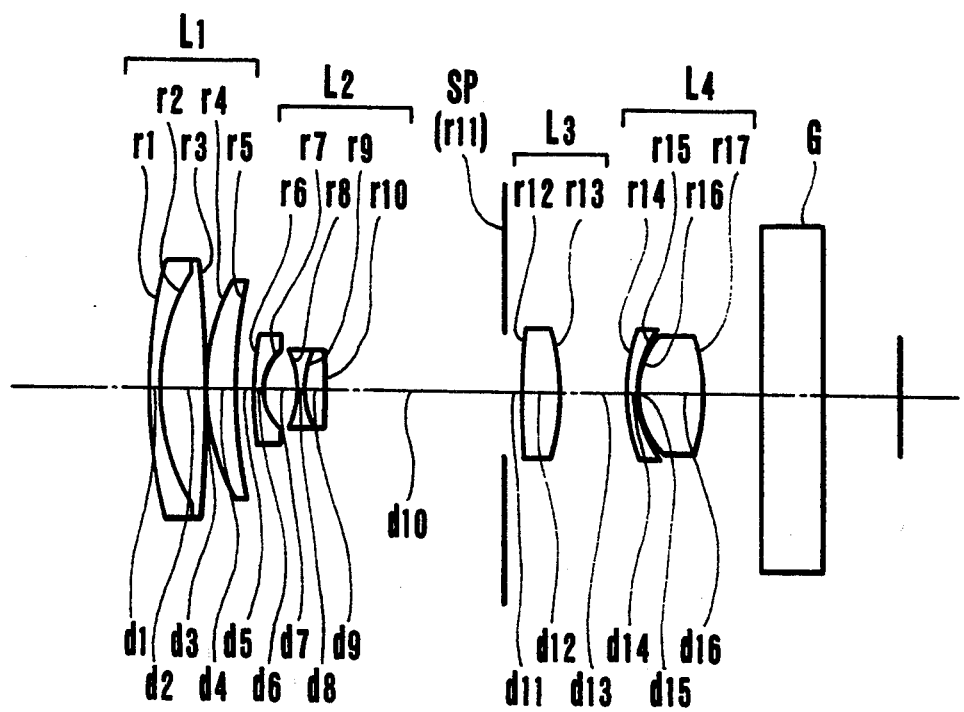
FIG. 7 is a longitudinal section view of a numerical example 6 of a zoom lens of the invention.
Figure 8:
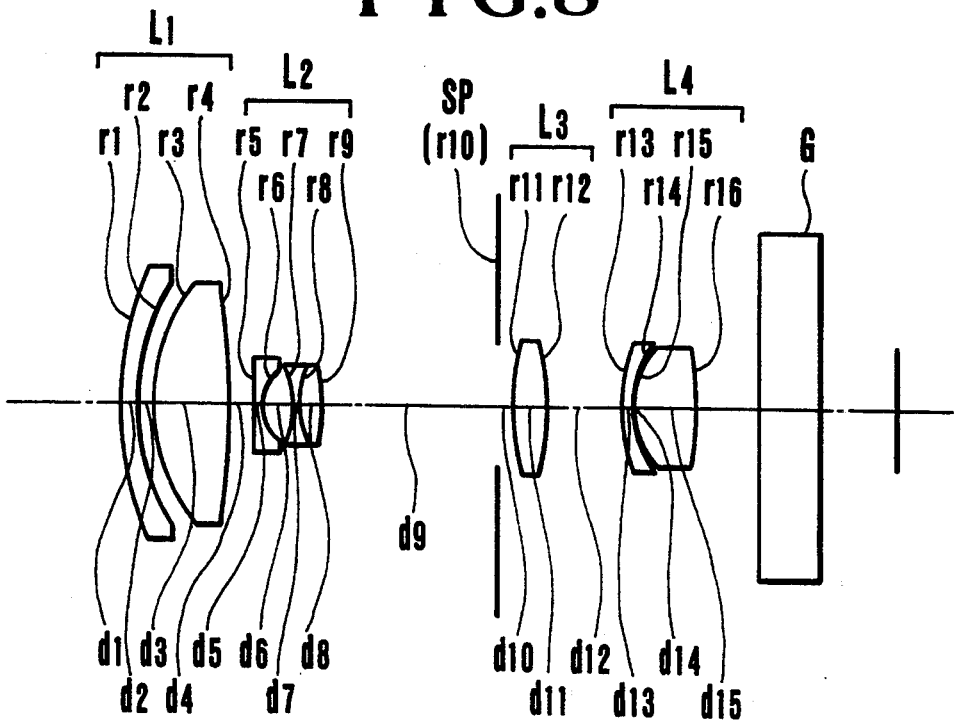
FIG. 8 is a longitudinal section view of a numerical example 7 of a zoom lens of the invention.
Figure 11:
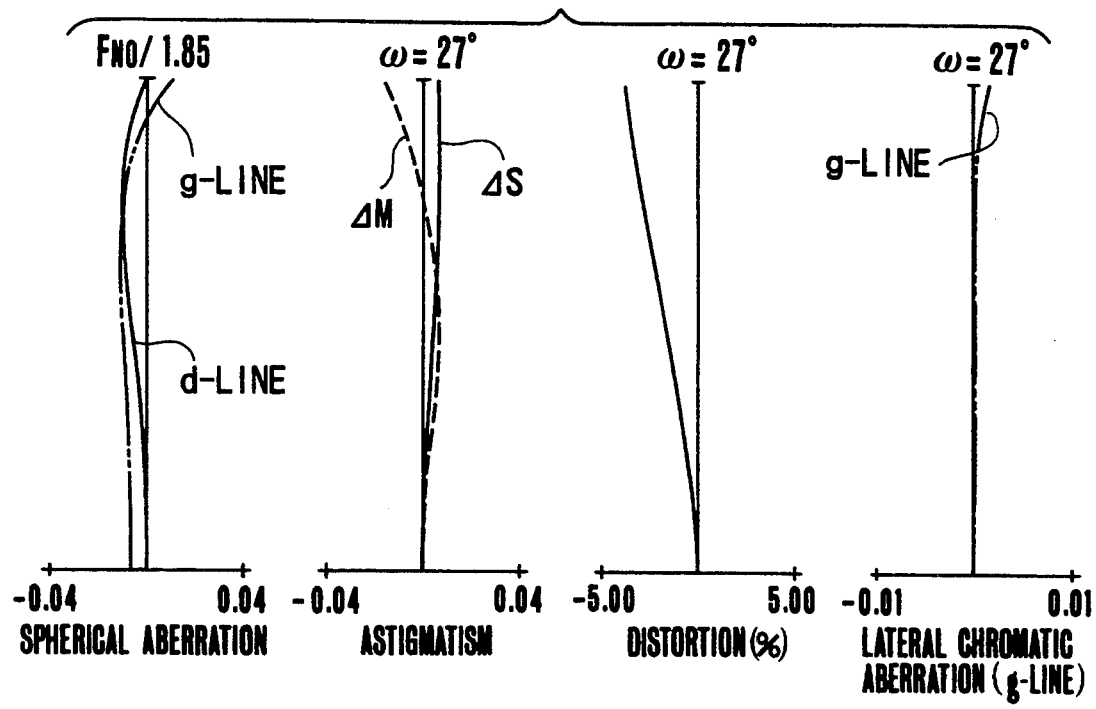
FIG. 11 shows graphic representations of the various aberrations of the numerical example 2 of the invention in the wide angle end.
Figure 12:
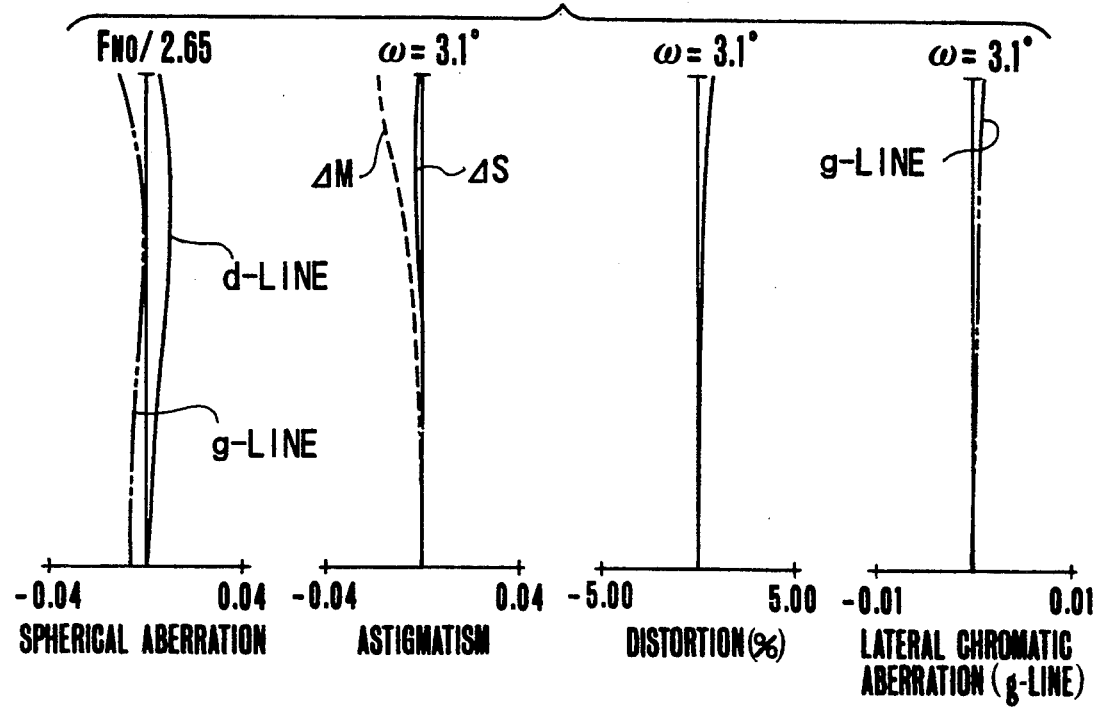
FIG. 12 shows graphic representations of the various aberrations of the numerical example 2 of the invention in the telephoto end.
Figure 13:
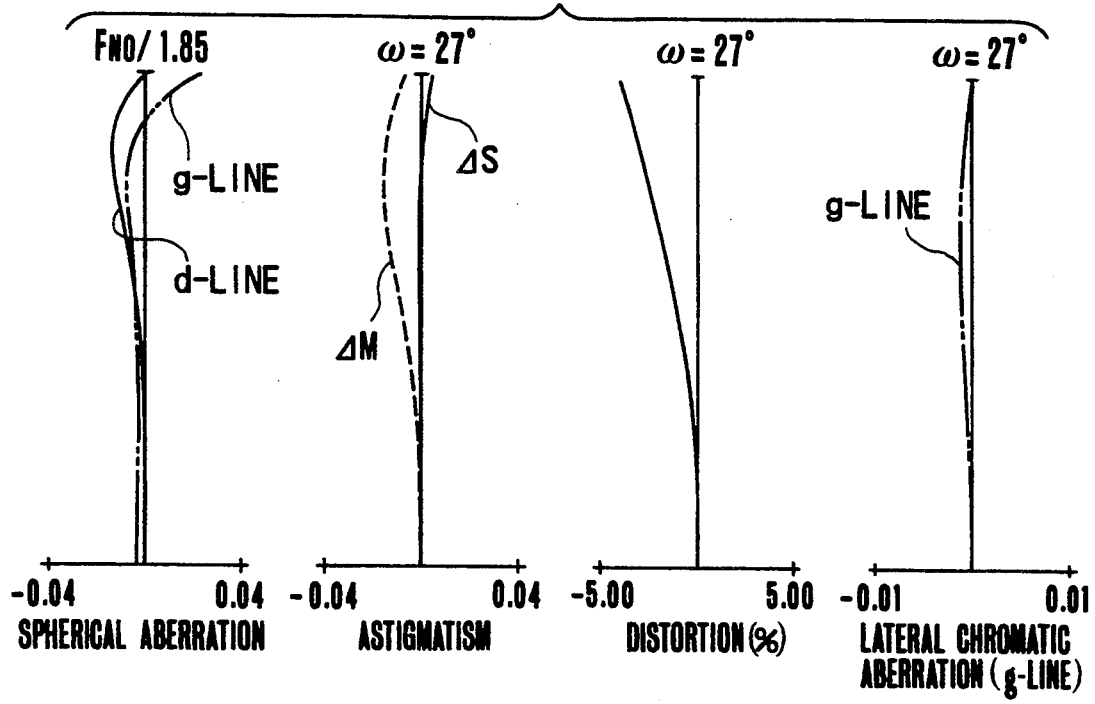
FIG. 13 shows graphic representations of the various aberrations of the numerical example 3 of the invention in the wide angle end.
Figure 14:
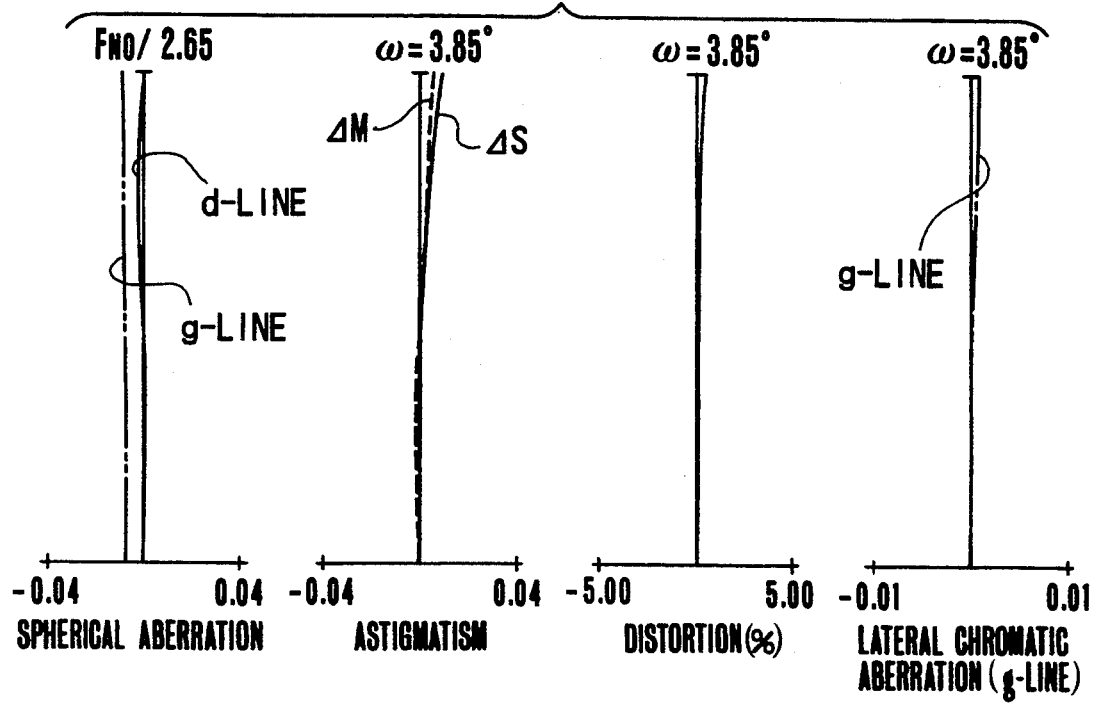
FIG. 14 shows graphic representations of the various aberrations of the numerical example 3 of the invention in the telephoto end.
Figure 15:
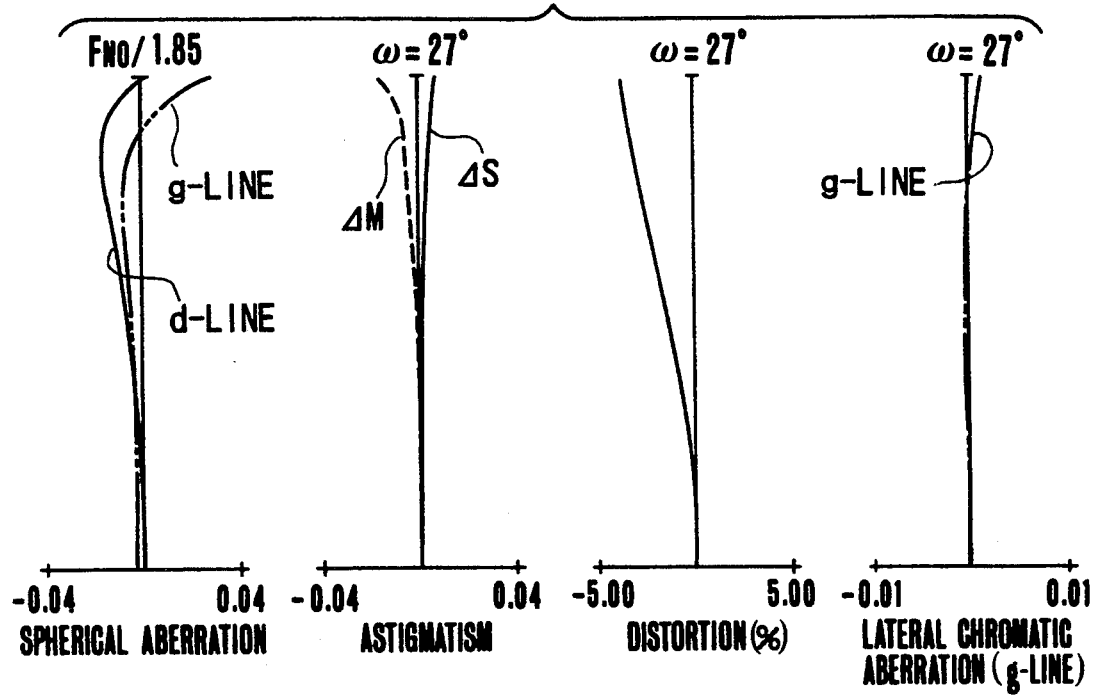
FIG. 15 shows graphic representations of the various aberrations of the numerical example 4 of the invention in the wide angle end.
Figure 16:
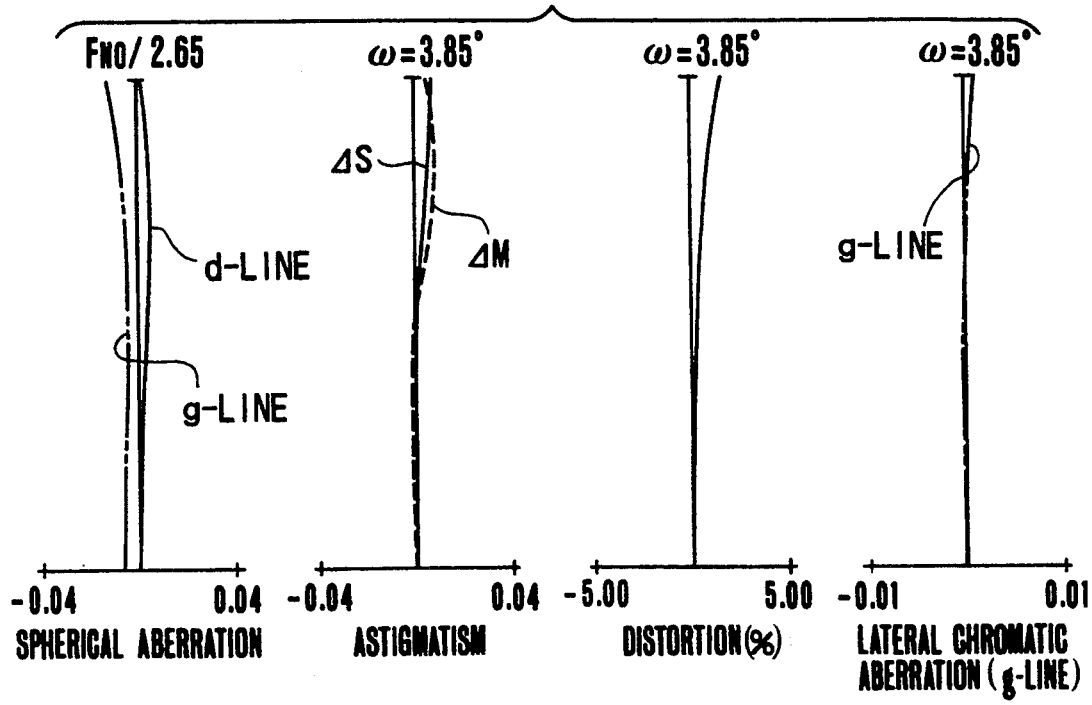
FIG. 16 shows graphic representations of the various aberrations of the numerical example 4 of the invention in the telephoto end.
Figure 17:
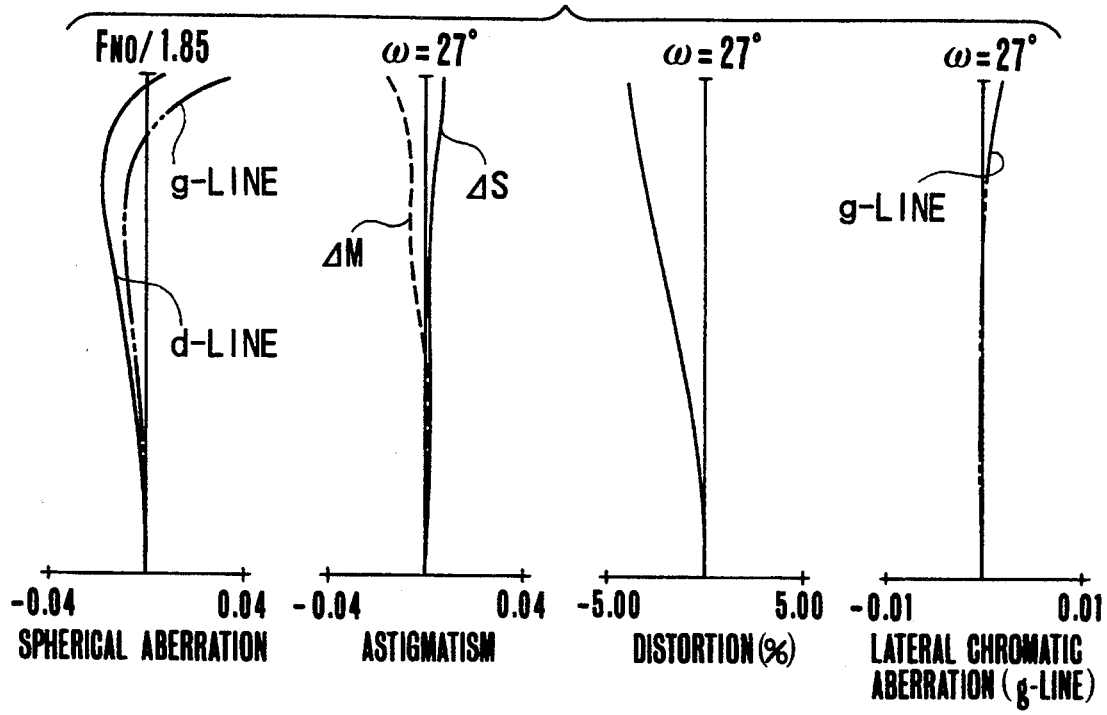
FIG. 17 shows graphic representations of the various aberrations of the numerical example 5 of the invention in the wide angle end.
Figure 18:
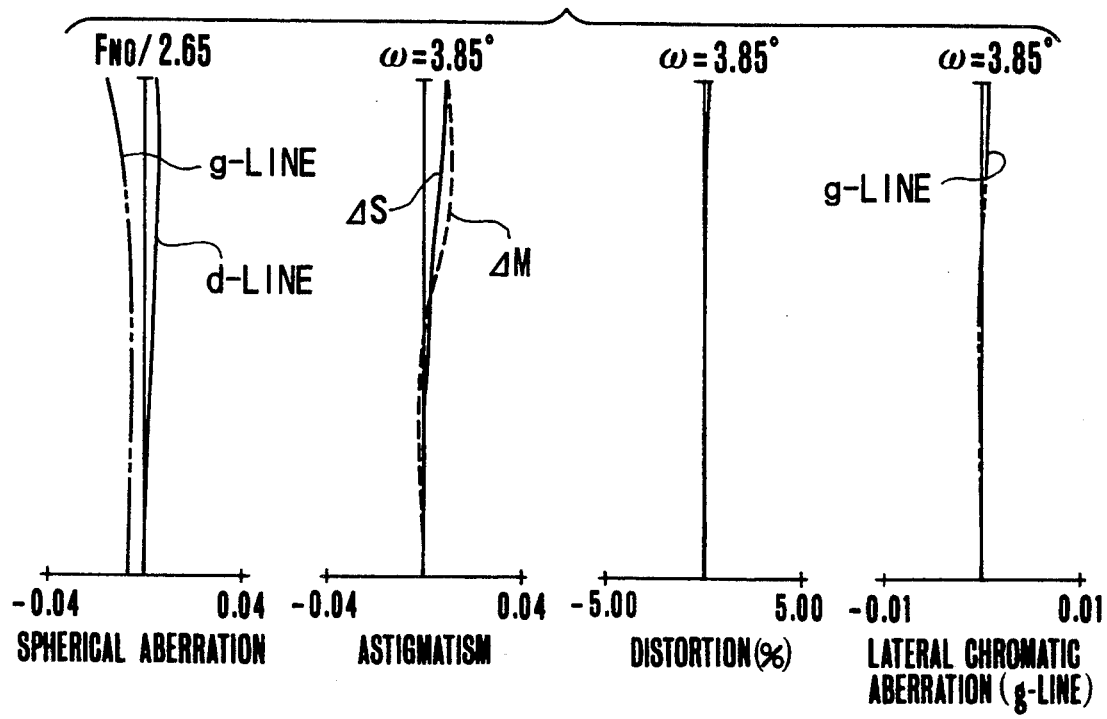
FIG. 18 shows graphic representations of the various aberrations of the numerical example 5 of the invention in the telephoto end.
Figure 19:
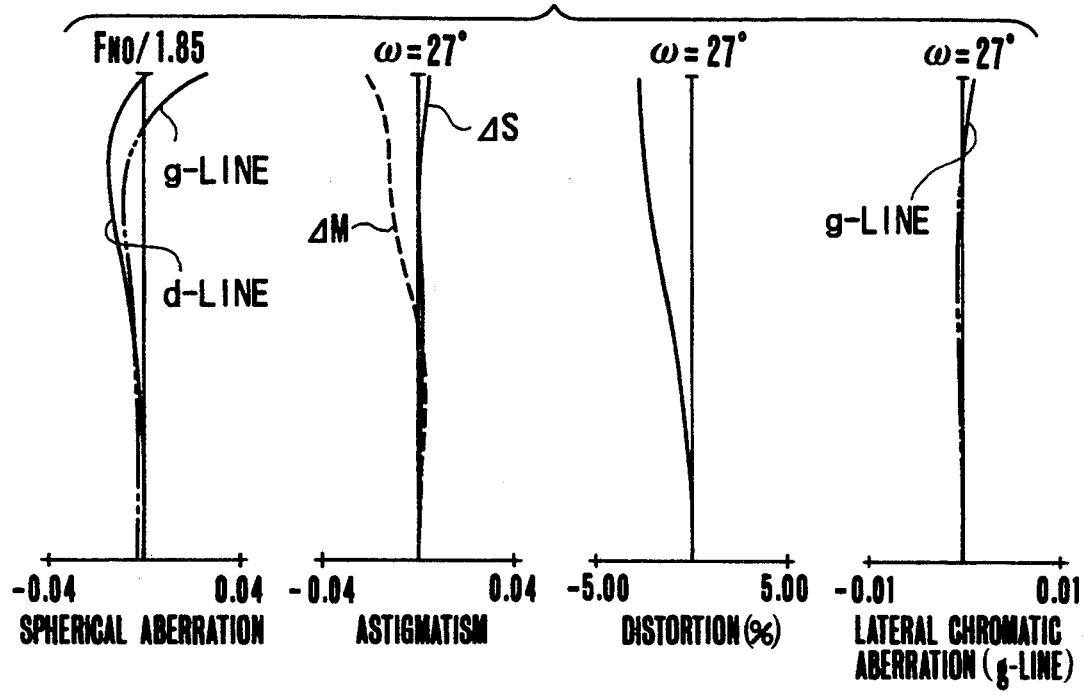
FIG. 19 shows graphic representations of the various aberrations of the numerical example 6 of the invention in the wide angle end.
Figure 20:
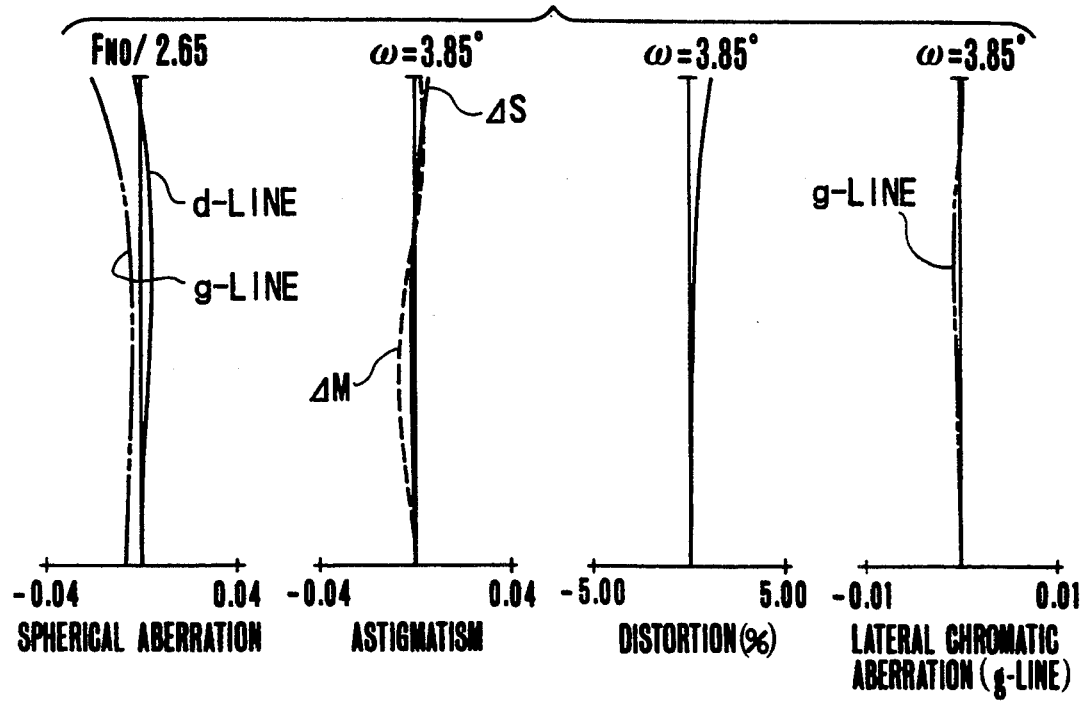
FIG. 20 shows graphic representations of the various aberrations of the numerical example 6 of the invention in the telephoto end.
Figure 21:
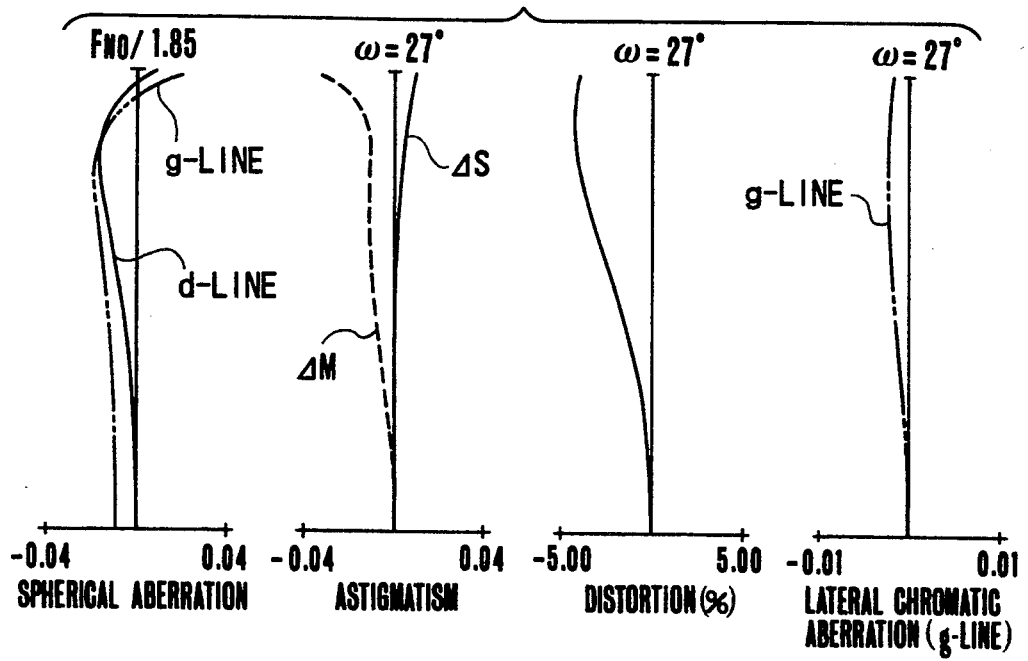
FIG. 21 shows graphic representations of the various aberrations of the numerical example 7 of the invention in the wide-angle end.
Figure 22:
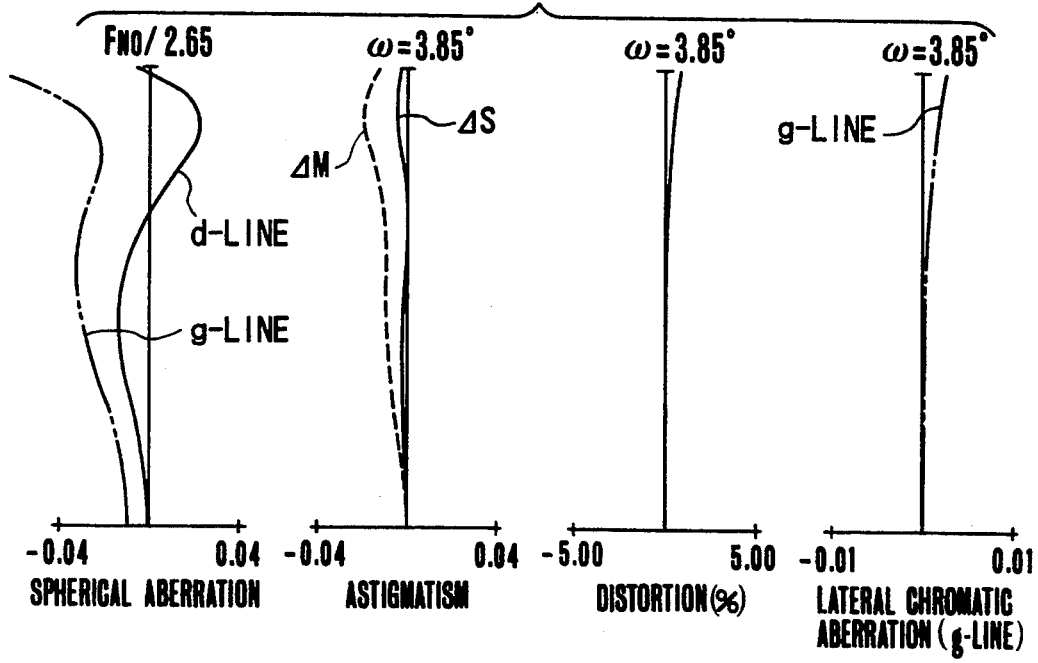
FIG. 22 shows graphic representations of the various aberrations of the numerical example 7 of the invention in the telephoto end.

FIG. 1 is a schematic diagram of an embodiment of a zoom lens of the rear focus type according to the invention with the paraxial refractive power arrangement thereof illustrated. FIGS. 2 to 8 show examples 1 to 7 of zoom lenses of which the numerical data are given later.

In the drawings, L1 denotes the first lens unit of positive refractive power, L2 the second lens unit of negative refractive power, L3 the third lens unit of positive refractive power, and L4 the fourth lens unit of positive refractive power. SP stands for the aperture stop arranged in front of the third lens unit L3. G represents a face plate or similar optical member.

When zooming from the wide-angle end to the telephoto end, the second lens unit is moved toward the image side, while the fourth lens unit is moved to compensate for the image shift with zooming, as indicated by arrows.

Also, focusing is performed by axially moving the fourth lens unit. That is, a rear focus type is employed. For the fourth lens unit, there are shown a solid line curve 4a and a dashed line curve 4b, depicting the loci of zooming movement for compensating for the image shift as pointed from the wide angle end to the telephoto end when focusing on an infinitely distant object and an object at the minimum distance, respectively. Incidentally, the first and third lens units remain stationary during zooming and focusing.

In the present embodiment, the function of compensating for the image shift with zooming and the focusing function are both laid on the fourth lens unit. So, in particular, its total zooming movement from the wide-angle end to the telephoto end is made to depict a convex locus toward the object side as shown by the curve 4a or 4b in FIG. 1. This movement enables the space between the third and fourth lens units to be utilized effectively. Thus, a shortening of the total length of the entire lens system is advantageously achieved.

In the present embodiment, when in, for example, the telephoto end, the fourth lens unit is moved forward to effect focusing from an infinitely distant object to an object at the minimum distance, as indicated by a straight-line arrow 4c.

In the present embodiment, as compared with the conventional type of 4-unit zoom lens in which the first lens unit is moved forward for focusing, the effective diameter of the first lens unit is prevented from largely increasing by the use of the rear focusing method.

The present invention has features such as the third lens unit is constructed with a positive single lens and at least one of its lens surfaces is provided with an aspherical shape, and that the fourth lens unit is constructed with a positive first lens and a negative second lens in this order from the front, and at least one of the lens surfaces of the first and second lenses is provided with an aspherical shape. With these features satisfied, the number of lens elements is reduced and the separations between any two of the lens units are shortened, while keeping a good optical performance. Thus, the physical length of the zoom lens is advantageously shortened. It is to be noted here that the positive and negative lenses constituting the fourth lens unit may be either in separate form or in cemented form.

Another feature is that an aperture stop is arranged just in front of the third lens unit. This arrangement minimizes variation of the aberrations ascribable to the movable lens units and allows the separations between those lens units which lie before the aperture stop to be shortened, making it easy to reduce the diameter of the front lens members.

Further features are the above-described conditions (1) and (2) for the parameters including the refractive powers of some of the lens units. The requirements of achieving the minimization of the size of the entire lens system and of securing a certain desired back focal distance can thus be fulfilled at once with the maintenance of good optical performance throughout the entire zooming range and further throughout the entire focusing range, in a high range zoom lens.

The technical significance of each of the conditions (1) and (2) is explained below.

The inequality of condition (1) is concerned with the ratio of the back focal distance to the focal length for the wide-angle end and has an aim chiefly to obtain a predetermined back focal distance under the condition that the entire lens system is minimized in size. When the back focal distance is too short as exceeding the lower limit of the condition (1), the shadows the foreign particles on the last lens surface cast onto the image sending plane sensor becomes appreciable, lowering the image quality.

The inequalities of condition (2) are concerned with the ratio of the product of the zoom ratio and the back focal distance to the overall focal length of the third and fourth lens units and have an aim chiefly to make a good compromise between minimization of the variation of aberrations and the certain back focal distance. When the overall positive refractive power of the third and fourth lens units is too weak as exceeding the lower limit of the condition (2), a short back focal distance results. As has been mentioned above, the shadows caused by foreign particles on the last lens surface appear along with the image, so that the image quality becomes objectionable. When the overall refractive power of the third and fourth lens units is too strong as exceeding the upper limit of the condition (2), or particularly when the refractive power of the fourth lens unit is too strong, the variation of aberrations with zooming and focusing increases objectionably.

The features for the rear focus type zoom lens described above suffice for accomplishing the object of the invention. To further achieve improvements of the bulk and size of the entire lens system and the stability of optical performance throughout the entire zooming range and throughout the entire focusing range, it is preferred to satisfy the following conditions:

$$(i) \; 0.3 < |f2/\sqrt{Fw \cdot FT}| < 0.4 \quad (3)$$

$$0.9 < |\beta2T/\sqrt{z}| < 1.23 \quad (4)$$

where f2 is the focal length of the second lens unit, $\beta2T$ is the magnifying power of the second lens unit in the telephoto end, and FT is the focal length of the entire lens system in the telephoto end.

The inequalities of condition (3) give a good compromise between suppression of the variation of aberrations with zooming and shortening of the physical length of the zoom lens. When the upper limit is exceeded, as this means that the negative refractive power of the second lens unit is too weak, the total movement of the second lens unit must be increased in order to keep a predetermined zoom ratio, so that the physical length of the zoom lens would be increased. When the lower limit is exceeded, as this means that the negative refractive power of the second lens unit is too strong, the negative Petzval sum is caused to increase. So, the curvature of field increases largely and the coma becomes difficult to correct well. A wide range of variation of aberrations with zooming also results. These defects should be averted.

When the lower limit of the condition (4) is exceeded, this means that the magnifying power of the second lens unit in the telephoto end takes too small an absolute value, the required amount of movement of the second lens unit for obtaining a predetermined zooming ratio is caused to increase largely. This in turn increases the physical length of the zoom lens. When the upper limit is exceeded, as this means that the magnifying power is too large, the sensitivity for the telephoto side becomes large, and the total zooming movement of the fourth lens unit becomes large, and further a short back focal distance results. So, these are disadvantageous.

$$(ii) \; 0.45 < e3w/\sqrt{Fw \cdot FT} < 0.74 \quad (5)$$

where e3w is the principal point interval between the third and fourth lens units in the wide-angle end.

When the lower limit of the condition (5) is exceeded, as this means that the principal point interval is too short, there results so short a space as not to assure full focusing movement of the fourth lens unit. When the upper limit is exceeded, as this means that the principal point interval is too long, it becomes difficult to keep the back focal distance at a predetermined value.

$$(iii) \; -5.5 < R3,b/\sqrt{Fw \cdot FT} < -1 \quad (6)$$

where R3,b is the radius of curvature of a lens surface on the image side of the third lens unit.

When the curvature of the lens surface on the image side of the third lens unit is lessening so as to exceed the lower limit of the condition (6), the reflected light from the image sensing plane is reflected again from that lens surface, forming flare or a ghost as it enters the image sensing plane. This should be avoided. When the upper limit is exceeded, this means that the refractive power of that lens surface is too strong, and it becomes difficult to compensate for the image shift during zooming.

It is to be noted that if that lens surface is aspherical, the radius of curvature R3,b should read the radius of the osculating sphere.

Examples 1 to 7 of specific zoom lenses according to the invention are shown below. In the numerical data of the examples 1 to 7, ri is the radius of curvature of the i-th lens surface when counted from the object side, di is the i-th lens thickness or air separation, and ni and $\upsilon$i are respectively the refractive index and Abbe number of the glass of the i-th lens element.

r18 and r19 in the numerical examples 1, 2, 4, 6 and 7, or the R19 and r20 in the numerical example 3 define a face plate or like glass block.

The shape of an aspheric surface is expressed in the coordinates with an X axis in the axial direction and an H axis in the perpendicular direction to the optical axis, the direction in which light advances being taken as positive, by the following equation:

$$X = (1/R)H^2/(1 + \sqrt{1 - (H/R)^2}) + AH^2 + BH^4 + CH^6 + DH^8$$

where R is the radius of the osculating sphere, and A, B, C and D are the aspheric coefficients.

Numerical Example 1
F = 1 − 7.6    Fno = 1:1.85 − 2.65    2ω = 54° − 7.7°

| | | | |
|---|---|---|---|
| r1 = 6.459 | d1 = 0.1562 | n1 = 1.80518 | ν1 = 25.4 |
| r2 = 2.944 | d2 = 0.5833 | n2 = 1.60311 | ν2 = 60.7 |
| r3 = 102.805 | d3 = 0.0417 | | |
| r4 = 2.902 | d4 = 0.4167 | n3 = 1.77250 | ν3 = 49.6 |
| r5 = 8.598 | d5 = Variable | | |
| r6 = 3.909 | d6 = 0.1250 | n4 = 1.88300 | ν4 = 40.8 |
| r7 = 0.785 | d7 = 0.4631 | | |
| r8 = −1.308 | d8 = 0.1250 | n5 = 1.51742 | ν5 = 52.4 |
| r9 = 1.293 | d9 = 0.2917 | n6 = 1.84666 | ν6 = 23.9 |
| r10 = −330.564 | d10 = Variable | | |
| r11 = Stop | d11 = 0.2188 | | |
| r12 = 4.197 | d12 = 0.5000 | n7 = 1.58313 | ν7 = 59.4 |
| r13 = −4.143 | d13 = Variable | | |
| r14 = 2.905 | d14 = 0.1458 | n8 = 1.84666 | ν8 = 23.9 |
| r15 = 1.260 | d15 = 0.0099 | | |
| r16 = 1.303 | d16 = 0.8750 | n9 = 1.58313 | ν9 = 59.4 |
| r17 = −2.464 | d17 = 0.8333 | | |
| r18 = ∞ | d18 = 0.8333 | n10 = 1.51633 | ν10 = 64.2 |
| r19 = ∞ | | | |

| Variable Separation | Focal Length | |
|---|---|---|
| | 1.00 | 7.60 |
| d5 | 0.20 | 2.50 |
| d10 | 2.48 | 0.19 |
| d13 | 1.00 | 1.00 |

| Aspheric Coefficients | | |
|---|---|---|
| | r12 | r17 |
| A | 0 | 0 |
| B | −2.395 × 10⁻² | −6.695 × 10⁻³ |
| C | 1.354 × 10⁻² | 1.326 × 10⁻² |
| D | −1.668 × 10⁻² | −3.563 × 10⁻² |
| E | 0 | 0 |

Numerical Example 2
F = 1 − 9.5    Fno = 1:1.85 − 2.65    2ω = 54° − 6.2°

| | | | |
|---|---|---|---|
| r1 = 8.874 | d1 = 0.1562 | n1 = 1.80518 | ν1 = 25.4 |
| r2 = 3.189 | d2 = 0.6250 | n2 = 1.60311 | ν2 = 60.7 |
| r3 = −106.663 | d3 = 0.0521 | | |
| r4 = 3.567 | d4 = 0.4479 | n3 = 1.77250 | ν3 = 49.6 |
| r5 = 9.694 | d5 = Variable | | |
| r6 = 3.249 | d6 = 0.1250 | n4 = 1.88300 | ν4 = 40.8 |
| r7 = 0.918 | d7 = 0.5763 | | |
| r8 = −1.304 | d8 = 0.1250 | n5 = 1.51742 | ν5 = 52.4 |
| r9 = 1.624 | d9 = 0.2917 | n6 = 1.84666 | ν6 = 23.9 |
| r10 = −41.068 | d10 = Variable | | |
| r11 = Stop | d11 = 0.2188 | | |
| r12 = 3.348 | d12 = 0.5312 | n7 = 1.58313 | ν7 = 59.4 |
| r13 = −5.727 | d13 = Variable | | |
| r14 = 3.485 | d14 = 0.1458 | n8 = 1.84666 | ν8 = 23.9 |
| r15 = 1.440 | d15 = 0.0139 | | |
| r16 = 1.496 | d16 = 0.7812 | n9 = 1.58313 | ν9 = 59.4 |
| r17 = −2.804 | d17 = 0.8333 | | |
| r18 = ∞ | d18 = 0.8333 | n10 = 1.51633 | ν10 = 64.2 |
| r19 = ∞ | | | |

| Variable Separation | Focal Length | |
|---|---|---|
| | 1.00 | 9.50 |
| d5 | 0.20 | 3.32 |
| d10 | 3.34 | 0.22 |
| d13 | 1.23 | 1.23 |

| Aspheric Coefficients | | |
|---|---|---|
| | r12 | r17 |
| A | 0 | 0 |
| B | −1.664 × 10⁻² | 1.917 × 10⁻³ |
| C | 1.065 × 10⁻³ | −1.041 × 10⁻³ |
| D | −2.413 × 10⁻³ | −9.156 × 10⁻³ |
| E | 0 | 0 |

Numerical Example 3:
F = 1 − 7.6    Fno = 1:1.85 − 2.65    2ω = 54° − 7.7°

| | | | |
|---|---|---|---|
| r1 = 6.585 | d1 = 0.1562 | n1 = 1.80518 | ν1 = 25.4 |
| r2 = 2.975 | d2 = 0.5833 | n2 = 1.60311 | ν2 = 60.7 |
| r3 = −311.492 | d3 = 0.0417 | | |
| r4 = 2.815 | d4 = 0.4167 | n3 = 1.77250 | ν3 = 49.6 |
| r5 = 7.929 | d5 = Variable | | |
| r6 = 2.843 | d6 = 0.1250 | n4 = 1.88300 | ν4 = 40.8 |
| r7 = 0.912 | d7 = 0.4739 | | |
| r8 = −1.275 | d8 = 0.1250 | n5 = 1.56873 | ν5 = 63.2 |
| r9 = 1.325 | d9 = 0.0949 | | |
| r10 = 1.683 | d10 = 0.2917 | n6 = 1.84666 | ν6 = 23.9 |
| r11 = 22.414 | d11 = Variable | | |
| r12 = Stop | d12 = 0.2188 | | |
| r13 = 3.761 | d13 = 0.5000 | n7 = 1.58313 | ν7 = 59.4 |
| r14 = −4.456 | d14 = Variable | | |
| r15 = 2.886 | d15 = 0.1458 | n8 = 1.84666 | ν8 = 23.9 |
| r16 = 1.292 | d16 = 0.0098 | | |
| r17 = 1.340 | d17 = 0.8750 | n9 = 1.58313 | ν9 = 59.4 |
| r18 = −2.537 | d18 = 0.8333 | | |
| r19 = ∞ | d19 = 0.8333 | n10 = 1.51633 | ν10 = 64.2 |
| r20 = ∞ | | | |

| Variable Separation | Focal Length | |
|---|---|---|
| | 1.00 | 7.60 |
| d5 | 0.11 | 2.32 |
| d11 | 2.40 | 0.20 |
| d14 | 1.00 | 1.00 |

| Aspheric Coefficients | | | |
|---|---|---|---|
| | r8 | r13 | r18 |
| A | 0 | 0 | 0 |
| B | 4.278 × 10⁻² | −2.381 × 10⁻² | −7.678 × 10⁻⁴ |
| C | 0 | 1.087 × 10⁻² | 1.600 × 10⁻³ |
| D | 0 | −1.194 × 10⁻² | −2.103 × 10⁻² |
| E | 0 | 0 | 0 |

Numerical Example 4:
F = 1 − 7.6    Fno = 1:1.85 − 2.65    2ω = 54° − 7.7°

| | | | |
|---|---|---|---|
| r1 = 6.471 | d1 = 0.1562 | n1 = 1.80518 | ν1 = 25.4 |
| r2 = 2.939 | d2 = 0.5521 | n2 = 1.60311 | ν2 = 60.7 |
| r3 = 87.958 | d3 = 0.0417 | | |
| r4 = 3.069 | d4 = 0.3958 | n3 = 1.77250 | ν3 = 49.6 |
| r5 = 10.666 | d5 = Variable | | |
| r6 = 5.513 | d6 = 0.1250 | n4 = 1.88300 | ν4 = 40.8 |
| r7 = 0.838 | d7 = 0.4343 | | |
| r8 = −1.368 | d8 = 0.1250 | n5 = 1.51742 | ν5 = 52.4 |
| r9 = 1.329 | d9 = 0.2708 | n6 = 1.84666 | ν6 = 23.9 |
| r10 = −131.124 | d10 = Variable | | |
| r11 = Stop | d11 = 0.2188 | | |
| r12 = 2.605 | d12 = 0.5000 | n7 = 1.58313 | ν7 = 59.4 |
| r13 = −14.156 | d13 = Variable | | |
| r14 = 2.831 | d14 = 0.1458 | n8 = 1.84666 | ν8 = 23.9 |
| r15 = 1.258 | d15 = 0.0131 | | |
| r16 = 1.311 | d16 = 0.8750 | n9 = 1.58313 | ν9 = 59.4 |
| r17 = −2.359 | d17 = 0.8333 | | |
| r18 = ∞ | d18 = 0.8333 | n10 = 1.51633 | ν10 = 64.2 |
| r19 = ∞ | | | |

| Variable Separation | Focal Length | |
|---|---|---|
| | 1.00 | 7.60 |
| d5 | 0.17 | 2.52 |
| d10 | 2.54 | 0.20 |

-continued

| | d13 | 1.02 | 1.02 |
|---|---|---|---|

| Aspheric Coefficients | | |
|---|---|---|
| | r12 | r17 |
| A | 0 | 0 |
| B | $2.670 \times 10^{-2}$ | $2.614 \times 10^{-3}$ |
| C | $-8.672 \times 10^{-3}$ | $5.568 \times 10^{-3}$ |
| D | $1.151 \times 10^{-2}$ | $-2.832 \times 10^{-2}$ |
| E | 0 | 0 |

Numerical Example 5:
$F = 1 - 7.6 \quad Fno = 1:1.85 - 2.65 \quad 2\omega = 54° - 7.7°$

| r1 = 5.765 | d1 = 0.1562 | n1 = 1.80518 | ν1 = 25.4 |
|---|---|---|---|
| r2 = 2.765 | d2 = 0.5625 | n2 = 1.60311 | ν2 = 60.7 |
| r3 = 30.627 | d3 = 0.0417 | | |
| r4 = 2.864 | d4 = 0.4167 | n3 = 1.77250 | ν3 = 49.6 |
| r5 = 8.578 | d5 = Variable | | |
| r6 = 4.004 | d6 = 0.1250 | n4 = 1.88300 | ν4 = 40.8 |
| r7 = 0.767 | d7 = 0.4543 | | |
| r8 = −1.421 | d8 = 0.1250 | n5 = 1.51742 | ν5 = 52.4 |
| r9 = 1.221 | d9 = 0.2917 | n6 = 1.84666 | ν6 = 23.9 |
| r10 = 44.580 | d10 = Variable | | |
| r11 = Stop | d11 = 0.2188 | | |
| r12 = 4.879 | d12 = 0.4792 | n7 = 1.58313 | ν7 = 59.4 |
| r13 = −3.472 | d13 = Variable | | |
| r14 = 2.982 | d14 = 0.1458 | n8 = 1.84666 | ν8 = 23.9 |
| r15 = 1.256 | d15 = 0.0103 | | |
| r16 = 1.304 | d16 = 0.8750 | n9 = 1.58313 | ν9 = 59.4 |
| r17 = −2.467 | d17 = 0.8333 | | |
| r18 = ∞ | d18 = 0.8333 | n10 = 1.51633 | ν10 = 64.2 |
| r19 = ∞ | | | |

| Variable | Focal Length | |
|---|---|---|
| Separation | 1.00 | 7.60 |
| d5 | 0.20 | 2.49 |
| d10 | 2.50 | 0.21 |
| d13 | 1.00 | 1.00 |

| Aspheric Coefficients | | |
|---|---|---|
| | r12 | r17 |
| A | 0 | 0 |
| B | $-2.383 \times 10^{-2}$ | $-9.301 \times 10^{-3}$ |
| C | $1.136 \times 10^{-2}$ | $1.022 \times 10^{-2}$ |
| D | $-1.621 \times 10^{-2}$ | $-3.720 \times 10^{-2}$ |
| E | 0 | 0 |

Numerical Example 6:
$F = 1 - 7.6 \quad Fno = 1:1.85 - 2.65 \quad 2\omega = 54° - 7.7°$

| r1 = 7.535 | d1 = 0.1562 | n1 = 1.80518 | ν1 = 25.4 |
|---|---|---|---|
| r2 = 3.144 | d2 = 0.5833 | n2 = 1.60311 | ν2 = 60.7 |
| r3 = −60.504 | d3 = 0.0417 | | |
| r4 = 2.951 | d4 = 0.4167 | n3 = 1.77250 | ν3 = 49.6 |
| r5 = 8.713 | d5 = Variable | | |
| r6 = 4.607 | d6 = 0.1250 | n4 = 1.88300 | ν4 = 40.8 |
| r7 = 0.814 | d7 = 0.4535 | | |
| r8 = −1.338 | d8 = 0.1250 | n5 = 1.51742 | ν5 = 52.4 |
| r9 = 1.307 | d9 = 0.2917 | n6 = 1.84666 | ν6 = 23.9 |
| r10 = −383.302 | d10 = Variable | | |
| r11 = Stop | d11 = 0.2188 | | |
| r12 = 4.584 | d12 = 0.5000 | n7 = 1.58313 | ν7 = 59.4 |
| r13 = −4.266 | d13 = Variable | | |
| r14 = 2.647 | d14 = 0.1458 | n8 = 1.84666 | ν8 = 23.9 |
| r15 = 1.240 | d15 = 0.0027 | | |
| r16 = 1.261 | d16 = 0.8750 | n9 = 1.58313 | ν9 = 59.4 |
| r17 = −2.679 | d17 = 0.8333 | | |
| r18 = ∞ | d18 = 0.8333 | n10 = 1.51633 | ν10 = 64.2 |
| r19 = ∞ | | | |

| Variable | Focal Length | |
|---|---|---|
| Separation | 1.00 | 7.60 |
| d5 | 0.24 | 2.54 |
| d10 | 2.49 | 0.19 |
| d13 | 0.96 | 1.02 |

| Aspheric Coefficients | | |
|---|---|---|
| | r12 | r13 | r17 |
|---|---|---|---|
| A | 0 | 0 | 0 |
| B | $-8.021 \times 10^{-2}$ | $-5.746 \times 10^{-2}$ | $6.837 \times 10^{-3}$ |
| C | $1.869 \times 10^{-2}$ | 0 | $1.595 \times 10^{-2}$ |
| D | $-2.128 \times 10^{-2}$ | 0 | $-4.367 \times 10^{-2}$ |
| E | 0 | 0 | 0 |

Numerical Example 7:
$F = 1 - 7.6 \quad Fno = 1:1.85 - 2.65 \quad 2\omega = 54° - 7.7°$

| r1 = 5.113 | d1 = 0.1562 | n1 = 1.78472 | ν1 = 25.7 |
|---|---|---|---|
| r2 = 3.075 | d2 = 0.2139 | | |
| r3 = 2.318 | d3 = 1.0905 | n2 = 1.60300 | ν2 = 65.5 |
| r4 = −8.430 | d4 = Variable | | |
| r5 = −23.904 | d5 = 0.1250 | n3 = 1.88300 | ν3 = 40.8 |
| r6 = 0.768 | d6 = 0.3658 | | |
| r7 = −1.376 | d7 = 0.1250 | n4 = 1.64328 | ν4 = 47.8 |
| r8 = 1.119 | d8 = 0.2917 | n5 = 1.85026 | ν5 = 32.3 |
| r9 = −2.955 | d9 = Variable | | |
| r10 = Stop | d10 = 0.2188 | | |
| r11 = 4.188 | d11 = 0.5000 | n6 = 1.58313 | ν6 = 59.4 |
| r12 = −4.392 | d12 = Variable | | |
| r13 = 2.446 | d13 = 0.1458 | n7 = 1.84666 | ν7 = 23.9 |
| r14 = 1.260 | d14 = 0.0149 | | |
| r15 = 1.350 | d15 = 0.8750 | n8 = 1.58313 | ν8 = 59.4 |
| r16 = −3.104 | d16 = 0.8333 | | |
| r17 = ∞ | d17 = 0.8333 | n9 = 1.51633 | ν9 = 64.2 |
| r18 = ∞ | | | |

| Variable | Focal Length | |
|---|---|---|
| Separation | 1.00 | 7.60 |
| d4 | 0.36 | 2.65 |
| d9 | 2.48 | 0.19 |
| d12 | 1.04 | 1.04 |

| Aspheric Coefficients | | | | |
|---|---|---|---|---|
| | r3 | r4 | r6 | r11 | r16 |
| A | 0 | 0 | 0 | 0 | 0 |
| B | $-5.854 \times 10^{-3}$ | $1.689 \times 10^{-3}$ | $-6.789 \times 10^{-2}$ | $-1.586 \times 10^{-2}$ | $-7.281 \times 10^{-3}$ |
| C | $-8.739 \times 10^{-4}$ | $6.565 \times 10^{-4}$ | 0 | $1.011 \times 10^{-2}$ | $4.308 \times 10^{-3}$ |
| D | 0 | 0 | 0 | $-1.198 \times 10^{-2}$ | $-3.633 \times 10^{-2}$ |
| E | 0 | 0 | 0 | 0 | 0 |

TABLE 1

| Con- | Numerical Example | | | | | | |
|---|---|---|---|---|---|---|---|
| di-tion | 1 | 2 | 3 | 4 | 5 | 6 | 7 |
| (1) | 2.49 | 2.51 | 2.49 | 2.52 | 2.49 | 2.49 | 2.44 |
| (2) | 3.00 | 3.05 | 3.03 | 2.98 | 3.00 | 3.03 | 2.95 |
| (3) | 0.35 | 0.37 | 0.33 | 0.36 | 0.35 | 0.35 | 0.35 |
| (4) | 1.00 | 1.00 | 1.00 | 1.00 | 1.00 | 1.05 | 1.00 |
| (5) | 0.59 | 0.62 | 0.59 | 0.64 | 0.59 | 0.55 | 0.58 |
| (6) | −1.50 | −1.86 | −1.61 | −5.14 | −1.26 | −1.55 | −1.59 |

According to the invention, the conditions for the refractive powers of the four lens units, the relation in which the second and fourth lens units move during zooming, and the overall refractive power of the third and fourth lens units are set forth as described above, and the lens configuration to move the fourth lens unit for focusing is employed, thereby giving an advantage of ensuring a certain desired back focal distance with a limitation on the size of the entire lens system to a minimum. Despite having as high a zooming range as 8 to 10, good stability of aberration correction can be maintained throughout the entire zooming range, and, moreover, the variation of aberrations with focusing is lessened for high optical performance, so that a zoom lens of the rear focus type whose relative aperture is as large as 1.8 in F-number is realized.

What is claimed is:

1. A zoom lens of the rear focus type comprising, in order from an object side, a first lens unit of positive refractive power, a second lens unit of negative refractive power, a third lens unit of positive refractive power, and a fourth lens unit of positive refractive power, said second lens unit being moved toward an image side when zooming from a wide-angle end to a telephoto end while said fourth lens unit is moved to compensate for the image shift with zooming, and focusing being performed by moving said fourth lens unit, wherein said third lens unit consists of a positive single lens having an aspheric surface, said fourth lens unit includes a negative first lens and a positive second Lens, at least one of lens surfaces of said negative first lens and said positive second lens is aspherical, and the following conditions are satisfied:

$$2.2 < |Fb/Fw|$$

$$2.9 < \sqrt{Z} \cdot Fb/f3,4 < 3.5$$

where f3,4 is the overall focal length of said third and fourth lens units in the wide-angle end, Fw is the focal length of the entire lens system in the wide-angle end, Fb is the distance from the last lens surface to an image plane which is shortest in an entire zooming range when focusing on an infinitely distant object, and Z is zoom ratio.

2. A zoom lens of the rear focus type according to claim 1, satisfying the following conditions:

$$0.3 < |f2/\sqrt{Fw \cdot FT}| < 0.4$$

$$0.9 < |\beta 2T/\sqrt{z}| < 1.23$$

where f2 is the focal length of said second lens unit, $\beta 2T$ is the magnifying power of said second lens unit in the telephoto end, and FT is the focal length of the entire lens system in the telephoto end.

3. A zoom lens of the rear focus type according to claim 2, satisfying the following condition:

$$0.45 < e3w/\sqrt{Fw \cdot FT} < 0.74$$

where e3w is a principal point interval between said third lens unit and said fourth lens unit in the wide-angle end.

4. A zoom lens of the rear focus type according to claim 3, satisfying the following condition:

$$-5.5 < R3,b/\sqrt{Fw \cdot FT} < -1$$

where R3,b is the radius of curvature of a lens surface on the image side of said third lens unit.

* * * * *

UNITED STATES PATENT AND TRADEMARK OFFICE
CERTIFICATE OF CORRECTION

PATENT NO. : 5,363,242  Page 1 of 2
DATED : November 8, 1994
INVENTOR(S) : HIDEO YOKOTA It is certified that error appears in the above-indentified patent and that said Letters Patent is hereby corrected as shown below:

ABSTRACT:

Line 13, "of lens" should read --of the lens--.

Line 14, "the the" should read --the--.

COLUMN 1:

Line 19, "zoom lens," should read --zoom lens--.

COLUMN 2:

Line 67, "lens surfaces" should read --the lens surfaces--.

COLUMN 5:

Line 29, "becomes" should read --become--.

COLUMN 6:

Line 58, "osculating" should read --oscillating--.

UNITED STATES PATENT AND TRADEMARK OFFICE
CERTIFICATE OF CORRECTION

PATENT NO. : 5,363,242
DATED : November 8, 1994
INVENTOR(S) : HIDEO YOKOTA

It is certified that error appears in the above-indentified patent and that said Letters Patent is hereby corrected as shown below:

COLUMN 7:

Line 12, "osculating" should read --oscillating--.

Line 51, "r2 = 3.189" should read --r2 = 3.819--.

COLUMN 11:

Line 18, "Lens" should read --lens--.

Line 19, "lens surfaces" should read --the lens surfaces--.

Signed and Sealed this

Eighth Day of August, 1995

Attest:

*Attesting Officer*

BRUCE LEHMAN
*Commissioner of Patents and Trademarks*